United States Patent
Jain

(10) Patent No.: US 9,949,353 B1
(45) Date of Patent: Apr. 17, 2018

(54) METHOD FOR CONTROLLING LIGHT PRESENTATION OF A LIGHT SYSTEM DURING PLAYBACK OF A MULTIMEDIA PROGRAM

(71) Applicant: TP Vision Holding B.V., Amsterdam (NL)

(72) Inventor: Vikas Jain, Karnataka (IN)

(73) Assignee: TP VISION HOLDING B.V., Amsterdam (NL)

( * ) Notice: Subject to any disclaimer, the term of this patent is extended or adjusted under 35 U.S.C. 154(b) by 0 days.

(21) Appl. No.: 15/688,456

(22) Filed: Aug. 28, 2017

(30) Foreign Application Priority Data

Aug. 21, 2017 (EP) .................................. 17187092

(51) Int. Cl.
| | |
|---|---|
| *H04N 5/57* | (2006.01) |
| *H05B 37/02* | (2006.01) |
| *F21V 33/00* | (2006.01) |
| *H04N 9/73* | (2006.01) |
| *G06F 3/14* | (2006.01) |

(52) U.S. Cl.
CPC ....... *H05B 37/029* (2013.01); *F21V 33/0052* (2013.01); *G06F 3/1423* (2013.01); *G09G 2320/06* (2013.01); *H04N 5/57* (2013.01); *H04N 9/73* (2013.01)

(58) Field of Classification Search
CPC ........................................................ H04N 5/57
USPC .................... 348/687, E5.119; 382/167, 162
See application file for complete search history.

(56) References Cited

U.S. PATENT DOCUMENTS

| | | | |
|---|---|---|---|
| 2005/0108766 A1* | 5/2005 | Hlasny ............. | G06F 17/30017 725/100 |
| 2005/0286427 A1* | 12/2005 | Hutter ................ | H04L 12/2805 370/241 |
| 2009/0226152 A1* | 9/2009 | Hanes ............... | G06F 17/30056 386/248 |
| 2010/0169514 A1* | 7/2010 | Noguchi ................ | H04N 7/163 710/19 |
| 2013/0155323 A1* | 6/2013 | Segal ..................... | H04N 5/445 348/563 |
| 2017/0005819 A1* | 1/2017 | Brandt ................... | G08C 19/00 |

* cited by examiner

*Primary Examiner* — Thuy Vinh Tran
(74) *Attorney, Agent, or Firm* — Hamre, Schumann, Mueller & Larson, P.C.

(57) ABSTRACT

A method for controlling light presentation of a light system is proposed to include steps of: (a) performing, by a media renderer, playback of a multimedia program; and (b) controlling, by the media renderer during the playback of the multimedia program in step (a), the light system to change light presentation thereof according to a light-timing file set that is prepared prior to step (a), and that indicates time points at which the light system is to change light presentation thereof during playback of the multimedia program.

6 Claims, 3 Drawing Sheets

| Light-timing File -RGB | |
|---|---|
| 00:00 | #FF00FF |
| 00:15 | #1A2B3C |
| ... | |
| ... | |
| ... | |
| 130:10 | #FAFAFA |

(a)

| Light-timing File -YUV | |
|---|---|
| 00:00 | #FF00FF |
| 00:15 | #278B76 |
| ... | |
| ... | |
| ... | |
| 130:10 | #FA8080 |

(b)

| Light-timing File -RGB | |
|---|---|
| 00:00 | #FF00FF |
| 00:15 | #1A2B3C |
| ⋮ | ⋮ |
| 130:10 | #FAFAFA |

(a)

| Light-timing File -YUV | |
|---|---|
| 00:00 | #FF00FF |
| 00:15 | #278B76 |
| ⋮ | ⋮ |
| 130:10 | #FA8080 |

METHOD FOR CONTROLLING LIGHT PRESENTATION OF A LIGHT SYSTEM DURING PLAYBACK OF A MULTIMEDIA PROGRAM

CROSS-REFERENCE TO RELATED APPLICATION

This application claims priority of European Patent Application No. EP17187092.6, filed on Aug. 21, 2017.

FIELD

The disclosure relates to a method for controlling light presentation of a light system, and more particularly to a light presentation method during playback of a multimedia program by a media renderer.

BACKGROUND

In a conventional approach to create an ambience using light to match a multimedia program which is being played by a television, the television is used to extract the color characteristics of a currently playing video of the multimedia program, and then control light sources of or around the television to emit light with colors consistent with those being played by the video in sync with playback of the multimedia program.

Such approach requires the television to be intelligent and entails intensive processing, resulting in high complexity in design and high cost of hardware.

SUMMARY

Therefore, an object of the disclosure is to provide a method for controlling light presentation of a light system that can alleviate at least one of the drawbacks of the prior art.

According to the disclosure, the method includes steps of: performing, by a media renderer, playback of a multimedia program; and controlling, by the media renderer during the playback of the multimedia program in step (a), the light system to change light presentation thereof according to a light-timing file set that is prepared prior to step (a), and that indicates time points at which the light system is to change light presentation thereof during playback of the multimedia program.

BRIEF DESCRIPTION OF THE DRAWINGS

Other features and advantages of the disclosure will become apparent in the following detailed description of the embodiment(s) with reference to the accompanying drawings, of which:

FIG. 2 is a schematic diagram exemplarily showing two formats of a light-timing file.

DETAILED DESCRIPTION

Figure 1:
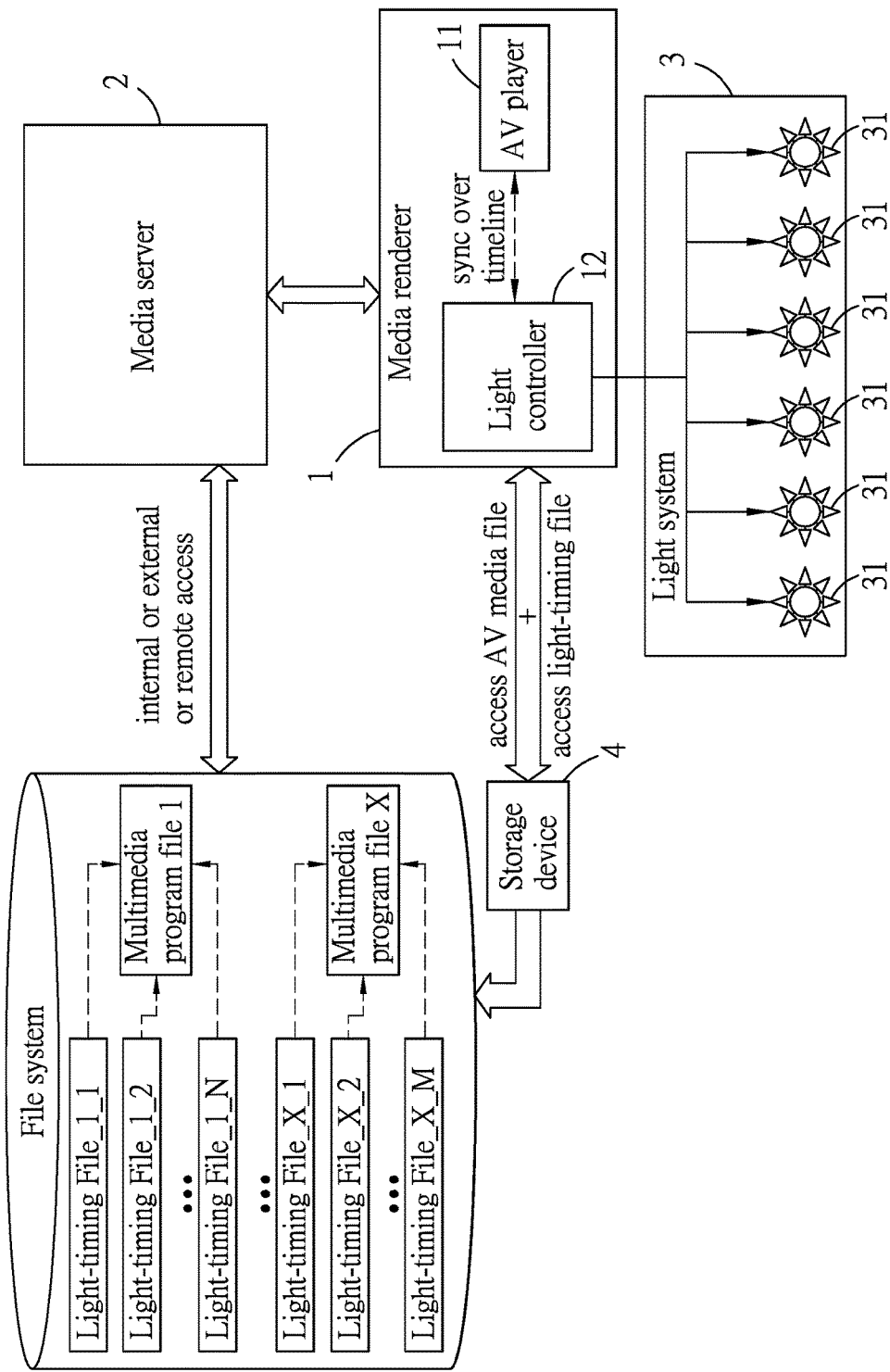
FIG. 1 is a block diagram illustrating an exemplary system used to implement an embodiment of a method for controlling light presentation of a light system during playback of a multimedia program.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, an exemplary system used to implement the embodiment of the method for controlling light presentation of a light system during playback of a multimedia program is shown to include a media renderer 1 (e.g., a smart television, a media player, etc.), a media server 2, and a light system 3 including one or more light sources (exemplified to be multiple light sources 31 in the embodiment) capable of light emission.

In this embodiment, the media renderer 1 includes an audio-video (AV) player 11, and a light controller 12 coupled to the light system 3 (via either a wired connection or wireless communication, such as IP technology, Zigbee, digital addressable lighting interface (DALI), etc.). The AV player 11 is used to perform playback of a multimedia program by accessing multimedia program data (e.g., executing a multimedia program file, such as an AV file, a static-image file or an audio file) that includes content of the multimedia program, and is capable of causing the light controller 12 to control light presentation (e.g., light color, brightness, etc., of light emitted thereby) of the light system 3 according to a light-timing file set so that the light presentation varies in sync with the playback of the multimedia program in time. The light-timing file set may include one or more light-timing files which are made and completed independently from and prior to real-time playback of the multimedia program. Each light-timing file corresponds to a respective light source 31, and indicates time points at which the corresponding light source 31 is to change light presentation (e.g., color change, brightness change, etc.) thereof during playback of the multimedia program. Referring to part (a) of FIG. 2, an exemplary light-timing file corresponding to the RGB color model is shown to be opened as normal text. The left part of the opened lighting-timing file recites time points (e.g., 130:10 representing a timing of 10 seconds after the 130th minute of the corresponding multimedia program) at which the light presentation is to change (or a specific light presentation is to begin), and the right part of the opened light-timing file recites specific light presentations (e.g., represented by values each for a respective one of red, green and blue color components in hexadecimals) respectively corresponding to the time points recited in the left part. Referring to part (b) of FIG. 2, an exemplary light-timing file corresponding to the YUV color model is shown to be opened as normal text. The left part of the opened lighting-timing file recites time points at which the light presentation is to change (or a specific light presentation is to begin), and the right part of the opened light-timing file recites specific light presentations (e.g., represented by values for a respective one of luma and chrominance components in hexadecimals) respectively corresponding to the time points recited in the left part. In a case that the multimedia program is a program of slideshow, the timing information recited in a light-timing file may be presented in a form of a playlist of slides.

The media server 2 is communicatively coupled to the media renderer 1 via a network (e.g., an Internet Protocol connectivity access network), and the multimedia program data is accessible by the media renderer 1 through the media server 2. In one example, the media server 2 may store the multimedia program file therein. In one example, the media server 2 may store metadata (e.g., uniform resource locator, URL) about the multimedia program data which is stored in other devices communicable with the media renderer/server 1, 2 over the network.

In one embodiment, the media server 2 may be replaced by a storage device 4 (e.g., a USB (universal serial bus) flash drive, a hard disk drive, etc.) that stores the multimedia program data and/or the light-timing file set therein and that is directly coupled to the media renderer 1, so that the media renderer 1 is able to directly access the multimedia program and/or the light-timing file set.

In this embodiment, the multimedia program data is stored separately from the light-timing file set, and has association with the light-timing file set, so that the media renderer 1 can correctly access the light-timing file set corresponding to the multimedia program data which is to be played. In one example, the association refers to that the multimedia program data has reference information with regard to the light-timing file set, such as URLs for the light-timing file set. In one example, the association refers to that the multimedia program data and the light-timing file set are stored in a same directory in the storage device 4. In one example, the association refers to that the light-timing file set has a name of which at least a part matches a name for the multimedia program data, so that the light-timing file set may be searched over the Internet according to the multimedia program data. In one example, the association refers to that the multimedia program data and the light-timing file set are broadcast content and separate program data, and are transmitted in a same data container (e.g., TS container). In one example, the association refers to that a metadata about the multimedia program data, which may be generated by the media server 2, has reference information with regard to the light-timing file set, so that when the media renderer 1 accesses the metadata for accessing the multimedia program data, the media renderer 1 knows how to access the light-timing file set.

In practice, when the multimedia program is an AV program or a static-image program (e.g., a program of slideshow), the light-timing file set may be created according to the color tones or color distributions of the multimedia program at different time points; and when the multimedia program is a pure audio program, the light-timing file set may be created according to music tempos or frequency ranges of the audio program at different time points, but this disclosure is not limited to such.

The light sources 31 may be internal light sources that are integrated in the media renderer 1, external light sources that are independent components from the media renderer 1, or a combination thereof. In one example, the light sources 31 that are connected to the media renderer 1 are capable of indicating their device capability information to the media renderer 1 in terms of, for example, available light colors, compatible color model, available light presentations, acceptable frequency at which the light presentation changes, etc., so that the media renderer 1 can determine/select an appropriate light-timing file set for the light sources 31. In a case that the light sources 31 are unable to convey their device capability information to the media renderer 1, the media renderer 1 may have a user interface for the user to manually enter the device capability information of the light sources 31 in the media renderer 1.

In one example, the light-timing file set includes a plurality of light-timing files each indicating time points at which a corresponding light source(s) 31 is to change light presentation thereof during playback of the multimedia program, and the media renderer 1 may be operated to or automatically associate each of the light sources 31 with one of the light-timing files according to the device capability information of each of the light sources 31. In one example, the media renderer 1 may be manually operated to associate each of the light sources 31 with one of the light-timing files without receipt of the device capability information. In some implementations, different light sources 31 are associated with or correspond to different light-timing files, respectively. In some implementations, different light sources 31 may be associated with or correspond to the same light-timing file if they have the same device capability and/or they are desired to have the same light presentation.

In a case that the multimedia program is an audio program, each of the light sources 31 may correspond to a speaker and be placed near the speaker, and the light-timing file for the light source 31 may be prepared to match the sound effect provided by the corresponding speaker. In one example, the media renderer 1 may have a user interface to configure which light source is in proximity to which speaker based on a type of the speaker (e.g., centre speaker, left and right front speakers, left and right rear speakers, etc.).

Figure 3:
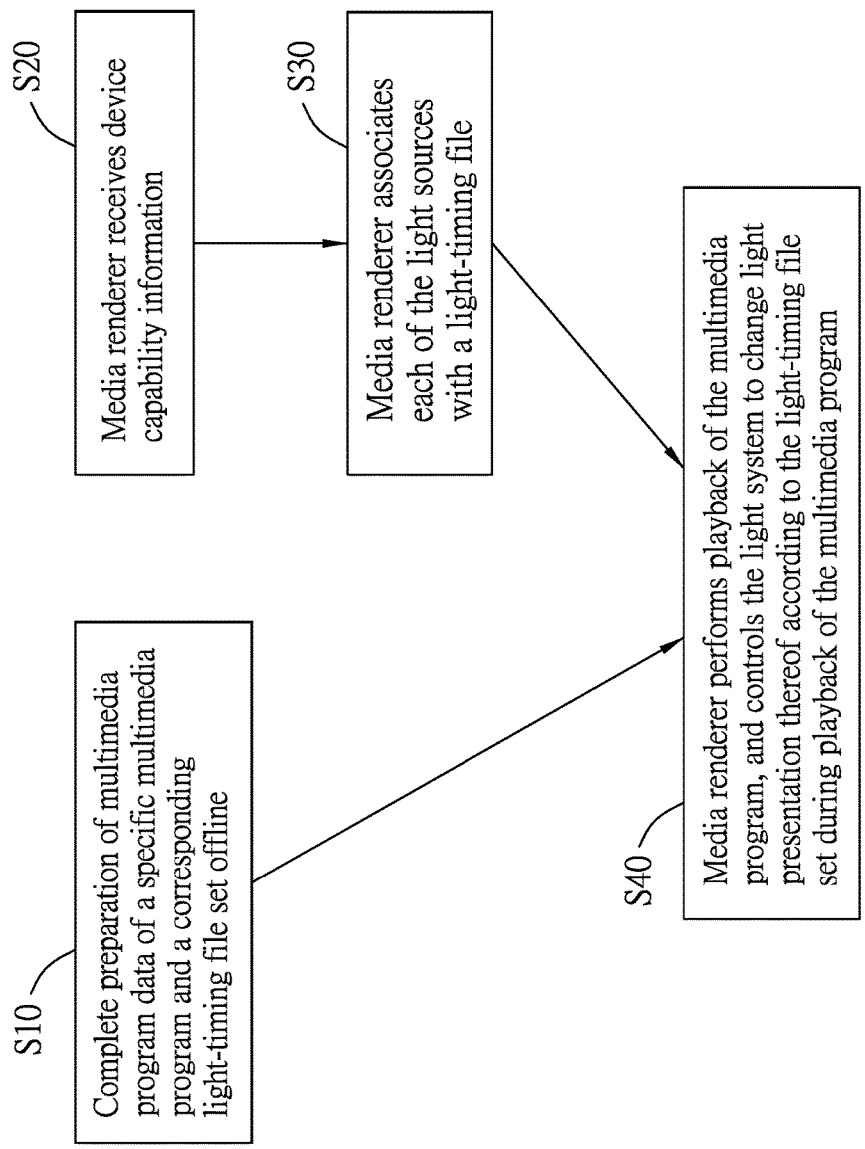
FIG. 3 is a flow chart illustrating steps of the embodiment.

Referring to FIGS. 1 and 3, the embodiment of the method for controlling light presentation of a light system during playback of a multimedia program includes the following steps S10-S40.

In step S10, the content provider completes preparation of multimedia program data of a specific multimedia program and a corresponding light-timing file set offline (e.g., using a computer independent from the media renderer 1), and stores the light-timing file set separately from the multimedia program data.

In step S20, the media renderer 1 receives device capability information of each of the light sources 31 either from the light sources 31 directly or through manual inputs by a user.

In step S30, the media renderer 1 associates each of the light sources 31 with a light-timing file of the light-timing file set.

In step S40, the media renderer 1 performs playback of the multimedia program, and controls the light system 3 to change light presentation thereof according to the light-timing file set during playback of the multimedia program.

In summary, by virtue of the light-timing file set which is created offline in advance, the method for controlling light presentation of a light system 3 according to this disclosure enables the light sources 31 of the light system 3 to generate ambience matching the multimedia program which is under playback without high hardware requirement for the media renderer 1. In addition, since the light-timing files can be prepared according to the capability of each light source 31, applicability is enhanced.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for controlling light presentation of a light system, comprising steps of:
   (a) performing, by a media renderer, playback of a multimedia program; and
   (b) controlling, by the media renderer during the playback of the multimedia program in step (a), the light system to change light presentation thereof according to a light-timing file set that is prepared prior to step (a), and that indicates time points at which the light system is to change light presentation thereof during playback of the multimedia program.

2. The method of claim 1, wherein the light-timing file set further indicates color changes to be presented by the light system at the time points.

3. The method of claim 1, wherein step (a) includes accessing multimedia program data that includes content of the multimedia program, that has association with the light-timing file set, and that is stored separately from the light-timing file set.

4. The method of claim 3, wherein the association between the multimedia program data and the light-timing file set includes at least one of:
   that the multimedia program data has reference information with regard to the light-timing file set;
   that the multimedia program data and the light-timing file set are stored in a same directory in a storage device;
   that the light-timing file set has a name of which at least a part matches a name for the multimedia program data;
   that the multimedia program data and the light-timing file set are transmitted in a same data container; or
   that a metadata about the multimedia program data has reference information with regard to the light-timing file set, and accessing the multimedia program data is performed by accessing the metadata.

5. The method of claim 1, wherein the light system includes a plurality of light sources, and the light-timing file set includes a plurality of light-timing files each indicating time points at which at least one of the light sources is to change light presentation thereof during playback of the multimedia program;
   said method further comprising, prior to step (a), steps of:
   (c) receiving, by the media renderer, device capability information of each of the light sources; and
   (d) associating, by the media renderer, each of the light sources with one of the light-timing files according to the device capability information of the light source.

6. The method of claim 5, wherein step (c) includes each of the light sources conveying the device capability information thereof to the media renderer.

* * * * *